C. HOOS.
GRASSHOPPER-KILLER.

No. 187,855. Patented Feb. 27, 1877.

WITNESSES: INVENTOR:
Chas. Hoos.
BY
ATTORNEYS.

UNITED STATES PATENT OFFICE.

CHARLES HOOS, OF ARAGO, NEBRASKA.

IMPROVEMENT IN GRASSHOPPER-KILLERS.

Specification forming part of Letters Patent No. 187,855, dated February 27, 1877; application filed December 18, 1876.

*To all whom it may concern:*

Figure 1:
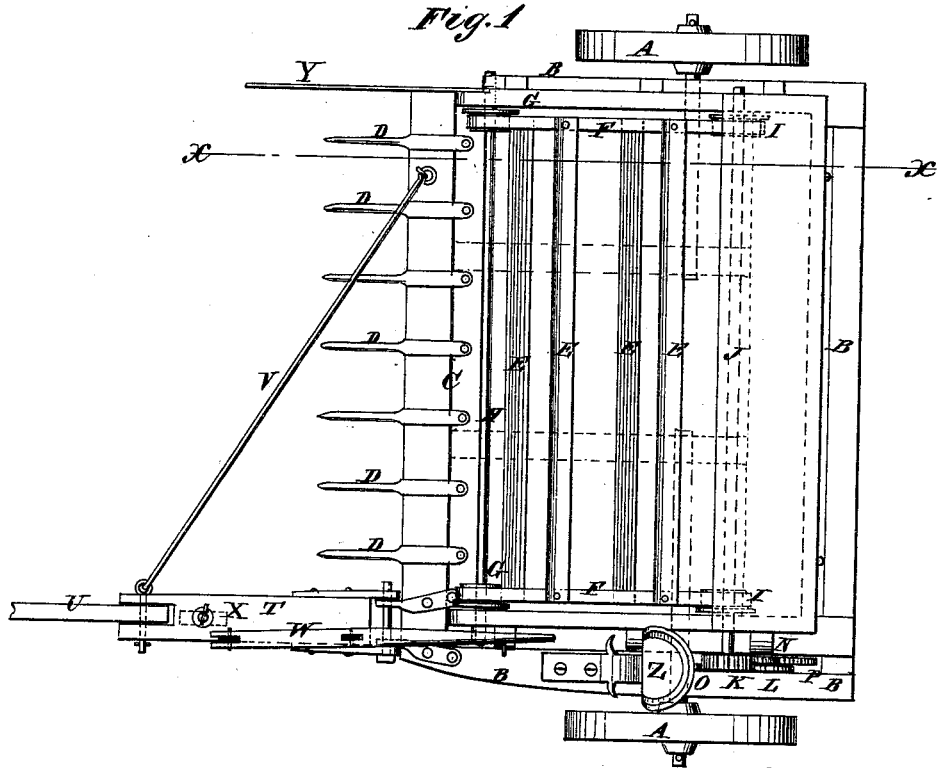
Figure 2:
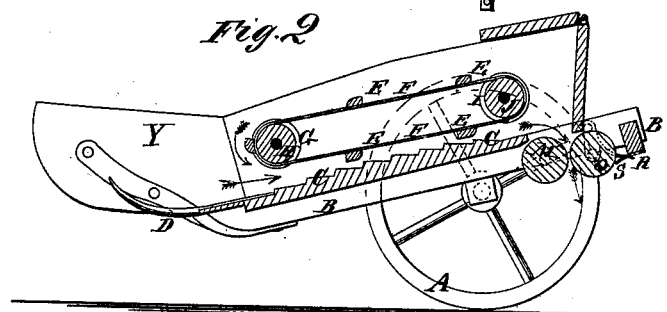
Figure 3:
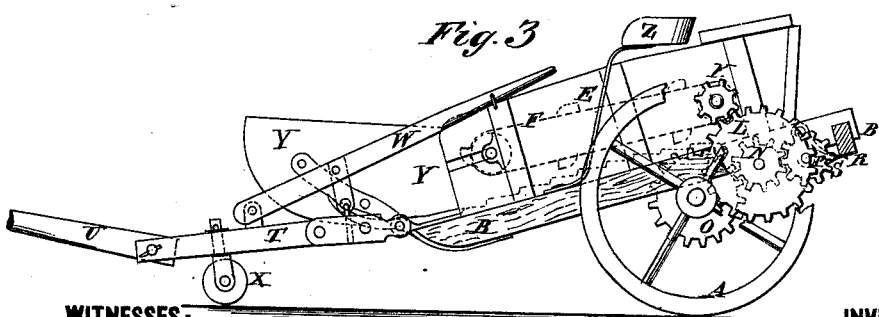

Be it known that I, CHARLES HOOS, of Arago, in the county of Richardson and State of Nebraska, have invented a new and useful Improvement in Grasshopper-Killer, of which the following is a specification:

Figure 1 is a top view of my improved machine. Fig. 2 is a vertical section of the same taken through the line $x\ x$, Fig. 1. Fig. 3 is a side view of the same.

Similar letters of reference indicate corresponding parts.

The object of this invention is to furnish a simple, convenient, and effective machine for killing grasshoppers upon a field.

The invention will first be described in connection with the drawing, and then pointed out in the claims.

A are the wheels, one of which revolves upon an axle attached to the frame B, and the other is rigidly attached to its axle, which revolves in bearings attached to the frame B. To the frame B is attached the platform C, to the front of which are attached a number of guards or fingers, D, which are curved upward, and are designed to enable the machine to pass over obstructions, and to cause the grasshoppers to rise from the ground and fall upon the platform C.

The platform C is grooved or rabbeted, as shown in Fig. 2, and is made highest in the center, and declines toward the front and rear, so that the grasshoppers may be crushed against the shoulders of said rabbets or grooves by the cross-bars E, attached to the endless belts F. The cross-bars E are rounded off upon their forward corners, so that they may pass over the grooves or rabbets of the platform C. The endless belts F pass over pulleys G, attached to a shaft, H, the journals of which work in bearings in the forward parts of the side boards of the platform C, and over pulleys I, attached to a shaft, J. The journals of the shaft J revolve in bearings in the rear parts of the side boards of the platform C, and to one of said journals is attached a gear-wheel, K, the teeth of which mesh into the teeth of the gear-wheel L, attached to the journal of the roller M. To the journal of the roller M is also attached a gear-wheel, N, the teeth of which mesh into the teeth of the gear-wheel O, attached to the revolving axle of the wheel A. The teeth of the gear-wheel N also mesh into the teeth of the gear-wheel P, attached to the journal of the roller Q, placed parallel with the roller M. The rollers M Q are placed at the rear edge of the platform C, so that any grasshoppers that may not be killed by the cross-bars F may be crushed by and between the rollers M Q.

The journals of the forward roller M revolve in stationary bearings attached to the frame B, and the journals of the rear roller Q revolve in movable bearings, which are held forward by springs R, so that the said roller Q may adjust itself according to the number of grasshoppers passing through the machine.

To the frame B are attached scrapers S, to scrape off the crushed grasshoppers from the rollers M Q. To one of the forward corners of the frame B is hinged the end of the draw-bar T, to the forward end of which is hinged the tongue U. The draw-bar T is strengthened against side draft by the brace V, the forward end of which is attached to the forward part of the said draw-bar T, and its rear end is attached to the frame B, near its other forward corner.

To the draw-bar T is attached a lever, W, which extends back into such a position that it may be conveniently reached and operated by the driver from his seat, to raise and lower the forward edge of the platform C. The lever W may be secured in place, when adjusted, by catches attached to the frame B, or to the side board of the platform C. The draw-bar T is supported by a small caster-wheel, X, attached to it.

To the other corner of the frame B is attached a guard-board or shield, Y, to prevent the grasshoppers from escaping, and to cause them to fall upon the platform C. Z is the driver's seat, the standard of which is attached to the frame B, and is provided with rests for the driver's feet.

Having thus described my invention, I claim as new and desire to secure by Letters Patent—

1. The combination of the wheels A, the frame B, the grooved or rabbeted platform C, the curved fingers D, the cross-bars E, the endless belts F, the pulleys and shafts G I H J, and the rollers M Q, with each other, substantially as herein shown and described.

2. The combination of the gear-wheels K L N O P with the rear shaft J, the rollers M Q, and the revolving axle of the wheel A, substantially as herein shown and described.

CHARLES HOOS.

Witnesses:
  C. SCHMIDT,
  F. W. BURCHARDT.